(12) United States Patent
Cherukara et al.

(10) Patent No.: US 12,395,587 B2
(45) Date of Patent: Aug. 19, 2025

(54) AUTOMATIC CALL CATEGORIZATION AND SCREENING

(71) Applicant: Google LLC, Mountain View, CA (US)

(72) Inventors: Joseph Joseph Cherukara, Mountain View, CA (US); Paul Dunlop, Mountain View, CA (US); Hanfu Zhang, Mountain View, CA (US); Milo Sredkov, Mountain View, CA (US); Aditi Bhargava, Mountain View, CA (US); Mariia Sandrikova, Mountain View, CA (US); Gustav Sennton, Mountain View, CA (US); Usman Abdullah, Mountain View, CA (US); Andres Calvo, Mountain View, CA (US); Brandon Maxwell, Mountain View, CA (US); Rebecca Gisoo Park Chiou, Mountain View, CA (US); Curtis Robinson, Mountain View, CA (US); Yale Thomas, Mountain View, CA (US); Richard Ledley, Mountain View, CA (US); Abhijith Shastry, Mountain View, CA (US); Ayesha Khwaja, Mountain View, CA (US); Xiansha Jin, Mountain View, CA (US); Wei Li Wang, Mountain View, CA (US); Subash Gutala, Mountain View, CA (US); Shashank Goyal, Mountain View, CA (US)

(73) Assignee: Google LLC, Mountain View, CA (US)

( * ) Notice: Subject to any disclaimer, the term of this patent is extended or adjusted under 35 U.S.C. 154(b) by 549 days.

(21) Appl. No.: 17/777,973

(22) PCT Filed: Nov. 18, 2020

(86) PCT No.: PCT/US2020/060965
§ 371 (c)(1),
(2) Date: May 18, 2022

(87) PCT Pub. No.: WO2021/101935
PCT Pub. Date: May 27, 2021

(65) Prior Publication Data
US 2023/0040084 A1    Feb. 9, 2023

Related U.S. Application Data

(60) Provisional application No. 62/937,769, filed on Nov. 19, 2019.

(51) Int. Cl.
*H04M 3/436*     (2006.01)
*G10L 15/26*     (2006.01)
*H04M 3/527*     (2006.01)

(52) U.S. Cl.
CPC ............ *H04M 3/436* (2013.01); *G10L 15/26* (2013.01); *H04M 3/527* (2013.01)

(58) Field of Classification Search
CPC .. H04M 3/436; H04M 3/527; H04M 2201/40; H04M 2203/2038;
(Continued)

(56) References Cited

U.S. PATENT DOCUMENTS 8,300,776 B2 * 10/2012 Davies .................... G10L 15/22
                                                  379/88.16
8,325,900 B2 * 12/2012 Trivi ...................... H04M 3/436
                                                  379/201.11
(Continued)

FOREIGN PATENT DOCUMENTS

CA      3076024 A1    3/2019
CN      1930864 A     3/2007

OTHER PUBLICATIONS

Response to Communication Pursuant to Rules 161(1) and 162 EPC dated Jun. 28, 2022, from counterpart European Application No. 20824025.9, filed Dec. 27, 2022, 20 pp.

(Continued)

*Primary Examiner* — Lisa Hashem
(74) *Attorney, Agent, or Firm* — Shumaker & Sieffert, P.A.

(57) ABSTRACT

Implementations described herein relate to methods, systems, and computer-readable media to automatically answer a call. In some implementations, a method includes receiving a call from a caller device at a client device. The method further includes determining, based on an identifier associated with the call, whether the call matches auto answer criteria, and yin response to determining that the call matches the auto answer criteria, answering the call without user input and without alerting a user of the client device. The method further includes generating a call embedding for the call based on received audio of the call, comparing the call embedding with spam embeddings to determine whether the call is a spam call, and in response to determining that the call is a spam call, terminating the call.

20 Claims, 6 Drawing Sheets (58) Field of Classification Search
CPC ........ H04M 2203/552; H04M 3/42042; G10L 15/26; G06F 16/685; G06F 16/61; G06F 16/65
See application file for complete search history.

(56) References Cited

U.S. PATENT DOCUMENTS

| | | | | |
|---|---|---|---|---|
| 8,488,479 | B2* | 7/2013 | Li | H04M 3/4365 709/227 |
| 8,601,547 | B1* | 12/2013 | Shen | G06F 21/6209 713/161 |
| 9,094,325 | B2* | 7/2015 | Rybak | H04W 28/0215 |
| 10,110,741 | B1 | 10/2018 | Cohen et al. | |
| 10,158,756 | B2* | 12/2018 | Beardow | H04M 3/42042 |
| 11,425,240 | B2* | 8/2022 | Lu | H04M 3/42042 |
| 2007/0041372 | A1* | 2/2007 | Rao | H04L 65/1101 370/356 |
| 2007/0201660 | A1* | 8/2007 | Lan | H04M 3/436 379/201.01 |
| 2008/0292077 | A1* | 11/2008 | Vinokurov | H04M 3/436 379/142.04 |
| 2009/0109961 | A1 | 4/2009 | Garrison et al. | |
| 2010/0151839 | A1 | 6/2010 | Krishnamurthy et al. | |
| 2011/0211685 | A1* | 9/2011 | Liu | H04L 65/1079 379/201.02 |
| 2011/0235631 | A1* | 9/2011 | Krishnaswamy | H04L 12/66 370/352 |
| 2011/0294478 | A1* | 12/2011 | Trivi | H04M 3/436 455/415 |
| 2015/0302316 | A1* | 10/2015 | Buryak | H04M 3/2281 706/12 |
| 2017/0013122 | A1 | 1/2017 | Cohen et al. | |
| 2017/0134574 | A1 | 5/2017 | Winkler | |
| 2018/0324297 | A1 | 11/2018 | Kent et al. | |
| 2019/0037073 | A1 | 1/2019 | Quilici et al. | |
| 2019/0230223 | A1* | 7/2019 | Kent | H04M 3/436 |
| 2024/0040035 | A1* | 2/2024 | Dropuljic | G10L 15/005 |

OTHER PUBLICATIONS

Communication pursuant to Article 94(3) EPC from counterpart European Application No. 20824025.9 dated Oct. 20, 2023, 10 pp.
First Examination Report from counterpart Indian Application No. 202247033655 dated Oct. 17, 2022, 6 pp.
Response to First Examination Report dated Oct. 17, 2022 from counterpart Indian Application No. 202247033655 filed Apr. 13, 2023, 7 pp.
Response to Communication pursuant to Article 94(3) EPC dated Oct. 20, 2023, from counterpart European Application No. 20824025.9 filed Feb. 28, 2024, 16 pp.
"Call Center Software Authentication & Anti Fraud Pindrop", accessed on Nov. 19, 2019; https://www.pindrop.com/, 13 pages.
EPO, International Search Report and Written Opinion for International Patent Application No. PCT/US2020/060965, Feb. 24, 2021, 15 pages.
"Screen your calls before answering them—Phone app Help", Accessed on Nov. 19. 2019; https://support.google.com/phoneapp/answer/9118387?hl=en, 2 pages.
Hardison, "On Your Side Investigation: Robokiller app", URL: https://www.wbrc.com/story/36609909/On-your-side-investigation-robokiller-app/ last two paragraphs; p. 1, p. 2, lines 1-9, Oct. 16, 2017.
Schuck, "We tried Robokiller. Here's what we liked and didn't like", URL:https://www.komando.com/smartphones-gadgets/robokiller-heres-what-we-liked-and-didnt-like/545200, p. 3, paragraph 3, p. 5, paragraph 1 "other interesting features"; p. 6, Apr. 6, 2019.
Summons to Attend Oral Proceedings Pursuant to Rule 115(1) EPC from counterpart European Application No. 20824025.9 dated Oct. 23, 2024, 14 pp.
Vennila et al., "Dynamic voice spammers detection using Hidden Markov Model for Voice over Internet Protocol network", Computers & Security, Elsevier Ltd., Oct. 13, 2017, 16 pp.
Response to Summons to Attend Oral Proceedings pursuant to Rule 115(1) EPC dated Oct. 23, 2024, including Main Request, from European Patent Application No. 20824025.9, filed Apr. 8, 2025, 23 pp.
Office Action, and translation thereof, from counterpart Chinese Application No. 202080075899.7 dated Apr. 8, 2025, 27 pp.
Communication pursuant to Article 94(3) EPC from counterpart European Application No. 20824025.9 dated Apr. 22, 2025, 11 pp.
Theodoridis Sergios et al: "Clustering: Basic Concepts", Pattern Recognition, 2009, pp. 595-625, XP093269335, DOI: https://doi.org/10/1016/B978-1-59749-2720.X0001-2 ISBN: 978-1-597 49-272-0.
Komando, "We tried Robokiller. Here's what we liked and didn't like", Komando.com, Apr. 6, 2019, 10 pp.
Hardison, "On Your Side Investigation: Robokiller app", WBRC Fox 6 News, Oct. 17, 2017, 2 pp.
Office Action, and translation thereof, from counterpart Korean Application No. 1020227015685 dated May 20, 2025, 14 pp.

* cited by examiner

AUTOMATIC CALL CATEGORIZATION AND SCREENING

RELATED APPLICATIONS

This application claims the benefit of U.S. Provisional Application No. 62/937,769, entitled "Automatic Spam Call Detection," and filed on Nov. 19, 2019, which is incorporated herein by reference in its entirety for all purposes.

BACKGROUND

Spam calls, including robocalls, are a large and growing problem. Users in the United States receive more than 4 billion robocalls every month. Many spam callers fake or spoof their numbers which limits the efficacy of number-based anti-spam tools such as lists of numbers associated with spam callers.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In some implementations, a computer-implemented method includes receiving a plurality of audio recordings wherein each audio recording corresponds to a respective call of a plurality of calls, and metadata for each of the plurality of calls; generating, using a trained machine-learning model, a respective embedding for each of the plurality of calls based on the corresponding audio recording; grouping the plurality of calls into a plurality of clusters based on the respective embeddings; and storing, in a database, a plurality of tuples, each tuple including a particular audio recording of the plurality of audio recordings, associated metadata, the embedding for the particular audio recording, and a cluster identifier for the particular audio recording.

In some implementations, the computer-implemented method may further include obtaining respective text transcripts of the plurality of audio recordings; and storing the respective text transcripts in a corresponding tuple, wherein generating the respective embedding for each of the plurality of calls is further based on the text transcript of the call.

In some implementations, the computer-implemented method may further include, for each of the plurality of clusters: determining a representative embedding for the cluster; determining a count of calls that match the cluster; determining a spam call count for the cluster; and calculating a score for the cluster based on one or more of the count of calls or the spam call count. In some implementations, the method may further include determining a subset of the plurality of clusters, wherein the score for each cluster in the subset of clusters meets a score threshold; and sending the representative embedding for each cluster in the subset to a client device. In some implementations, the method may further include receiving data indicative of one or more of a current country or a home country for the client device. In these implementations, determining the subset further includes selecting the subset based on the received data, wherein clusters that include calls that have metadata that does not match the current country or the home country are excluded from the subset. In some implementations, determining the representative embedding for the cluster comprises one of: selecting an embedding that corresponds to a first audio recording in the cluster as the representative embedding; selecting an average of a plurality of embeddings that correspond to calls in the cluster as the representative embedding; or selecting a particular embedding of the plurality of embeddings that is closest to the average of the plurality of embeddings.

In some implementations, the embedding for each call within each of the plurality of clusters is within a threshold edit distance of embeddings from other calls in the cluster. In some implementations, the method may further include receiving performance metrics; and updating the machine-learning model based on the performance metrics.

In some implementations, a computer-implemented method to automatically answer a call includes receiving, at a client device, a call from a caller device; determining, by the client device, based on an identifier associated with the call, whether the call matches auto answer criteria; in response to determining that the call matches the auto answer criteria, and answering the call, by the client device, without user input and without alerting a user of the client device. The method further includes, after answering the call, generating, by the client device, using a trained machine-learning model, a call embedding for the call based on received audio of the call; comparing, by the client device, the call embedding with spam embeddings to determine whether the call is a spam call; and in response to determining that the call is a spam call, terminating the call.

In some implementations, the method may further include generating and storing, by the client device, a text transcript of the call. In some implementations, generating the call embedding is further based on the text transcript of the call.

In some implementations, the method may further include, in response to determining that the call is not a spam call, alerting the user of the client device, wherein alerting the user comprises ringing the client device and providing a text transcript of the received audio of the call.

In some implementations, answering the call may include establishing a connection with a caller device; and sending audio from the client device to the caller device, wherein the audio is generated by the client device without user input.

In some implementations, wherein determining that the call matches auto answer criteria is based on at least one of: determining that the identifier associated with the call matches a spam caller list; determining that the identifier associated with the call is a fake number; determining that the identifier associated with the call is a private number; determining that the identifier associated with the call and an identifier associated with the client device meet a similarity threshold; determining that the identifier associated with the call is not in a contact list of a user of the client device; or determining that the identifier associated with the call is not in a call log of the client device.

In some implementations, determining that the call does not match the auto answer criteria is based on at least one of: determining that the identifier associated with the call is in a contact list of a user of the client device; determining that the identifier associated with the call is in a call log of the client device; determining that the identifier associated with the call indicates that the call is an emergency call; or determining that an emergency call was placed from the client device within a threshold from a current time.

In some implementations, the method may further include, in response to determining that the call does not match the auto answer criteria, alerting the user of the client device.

In some implementations, the spam embeddings may be stored locally on the client device, and the method may further include receiving the spam embeddings from a server and storing the spam embeddings locally on the client device.

Some implementations include a computing device that comprises a processor and a memory coupled to the processor with instructions stored thereon that cause the processor to perform any of the methods described herein.

Some implementations include a non-transitory computer-readable medium with instructions stored thereon that, when executed by a processor, cause the processor to perform any of the methods described herein.

DETAILED DESCRIPTION

Some implementations described herein relate to methods, systems, and computer-readable media to generate models of robo and/or spam callers. In some implementations, call embeddings (spam embeddings) that are representative of calls from robo and/or spam callers are generated. The described implementations generate spam embeddings, e.g., numerical representations, from audio recordings (e.g., a training corpus) using a trained machine-learning model. The corpus may include audio recordings of calls or other audio recordings that include spam content. The spam embeddings are provided, e.g., from a server, to client devices that store the spam embeddings local storage.

Some implementations described herein relate to methods, systems, and computer-readable media to automatically answer calls and to detect spam calls. Upon receipt of a call at a client device, the client device determines if the call meets auto answer criteria. If the call meets auto answer criteria, the call is automatically answered (without disturbing the user). A call embedding is obtained based on call content, e.g., audio received from the caller and/or text transcript of the audio. The call embedding is compared with spam embeddings to determine if the call is a spam call. In some implementations, the comparison may be performed by an on-device model (e.g., a trained machine learning model) that analyzes the call and determines whether the call meets the auto answer criteria. If the call is determined to be a spam call, the call is terminated; else, the user is alerted to the call. Information regarding the call, e.g., a text transcript, is provided to the user before the user interacts with the call.

The described techniques can detect and mitigate spam calls automatically, without interrupting the user, based on what was said (text transcript) and/or how it was said (call audio). Detection and mitigation are performed locally on a client device and do not require active Internet connectivity. The described techniques enable a reduction in the number of calls a user interacts with. The described techniques can be implemented in a call handling application, in a virtual assistant application, or other application executing locally on the client device that receives a call.

Figure 1:
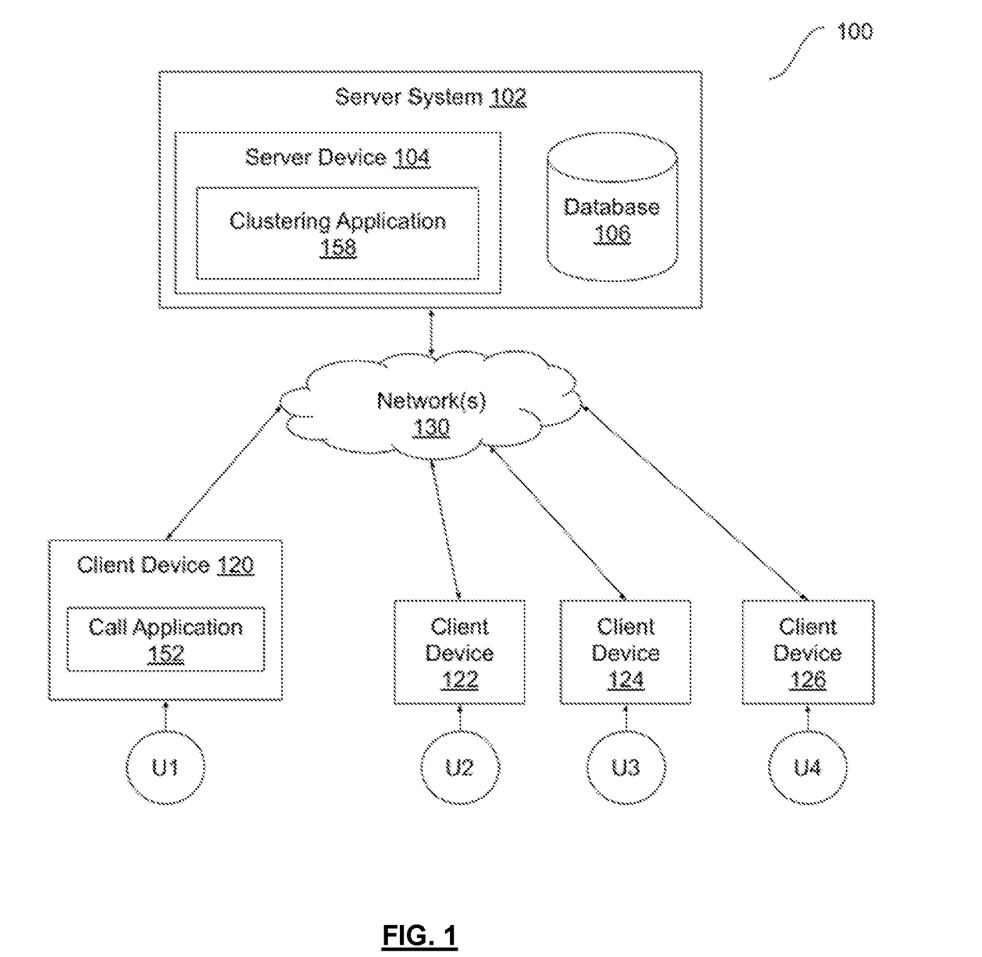
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, e.g., server system 102 in the example of FIG. 1. Server system 102 Can communicate with a network 130, for example. Server system 102 can include a server device 104 and a database 106 or other storage device. In some implementations, server device 104 may provide clustering application 158.

Network environment 100 also can include one or more client devices, e.g., client devices 120, 122, 124, and 126, which may communicate with each other and/or with server system 102 and/or second server system 140 via network 130. Network 130 can be any type of communication network, including one or more of the Internet, local area networks (LAN), wireless networks, switch or hub connections, etc.

For ease of illustration, FIG. 1 shows one block for server system 102, server device 104, database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, database 106 and/or other storage devices can be provided in server system block(s) that are separate from server device 104 and can communicate with server device 104 and other server systems via network 130.

Also, there may be any number of client devices. Each client device can be any type of electronic device capable of communication, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), etc. Some client devices may also have a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102 and/or via a network service, e.g., a social network service or other type of network service, implemented on server system 102. For example, respective client devices 120, 122, 124, and 126 may communicate data to and from one or more server systems, e.g., server system 102.

In some implementations, the server system 102 may provide appropriate data to the client devices such that each client device can receive communicated content or shared content uploaded to the server system 102. In some examples, users U1-U4 can interact via audio or video conferencing, audio, video, or text chat, or other communication modes or applications.

A network service implemented by server system 102 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service.

In some implementations, any of client devices 120, 122, 124, and/or 126 can provide one or more applications. For example, as shown in FIG. 1, client device 120 may provide call application 152. Client devices 122-126 may also provide similar applications. Call application 152 may be implemented using hardware and/or software of client device 120. In different implementations, call application 152 may be a standalone client application, e.g., executed on any of client devices 120-124. Call application 152 may provide various functions related to calls, e.g., receiving calls, automatically answering calls, alerting users, generating text transcripts, detecting spam calls, etc.

A user interface on a client device 120, 122, 124, and/or 126 can enable the display of user content and other content, including images, video, data, and other content as well as communications, settings, notifications, and other data. Such a user interface can be displayed using software on the client device, software on the server device, and/or a combination of client software and server software executing on server device 104. The user interface can be displayed by a display device of a client device, e.g., a touchscreen or other display screen, projector, etc.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks.

Figure 2:
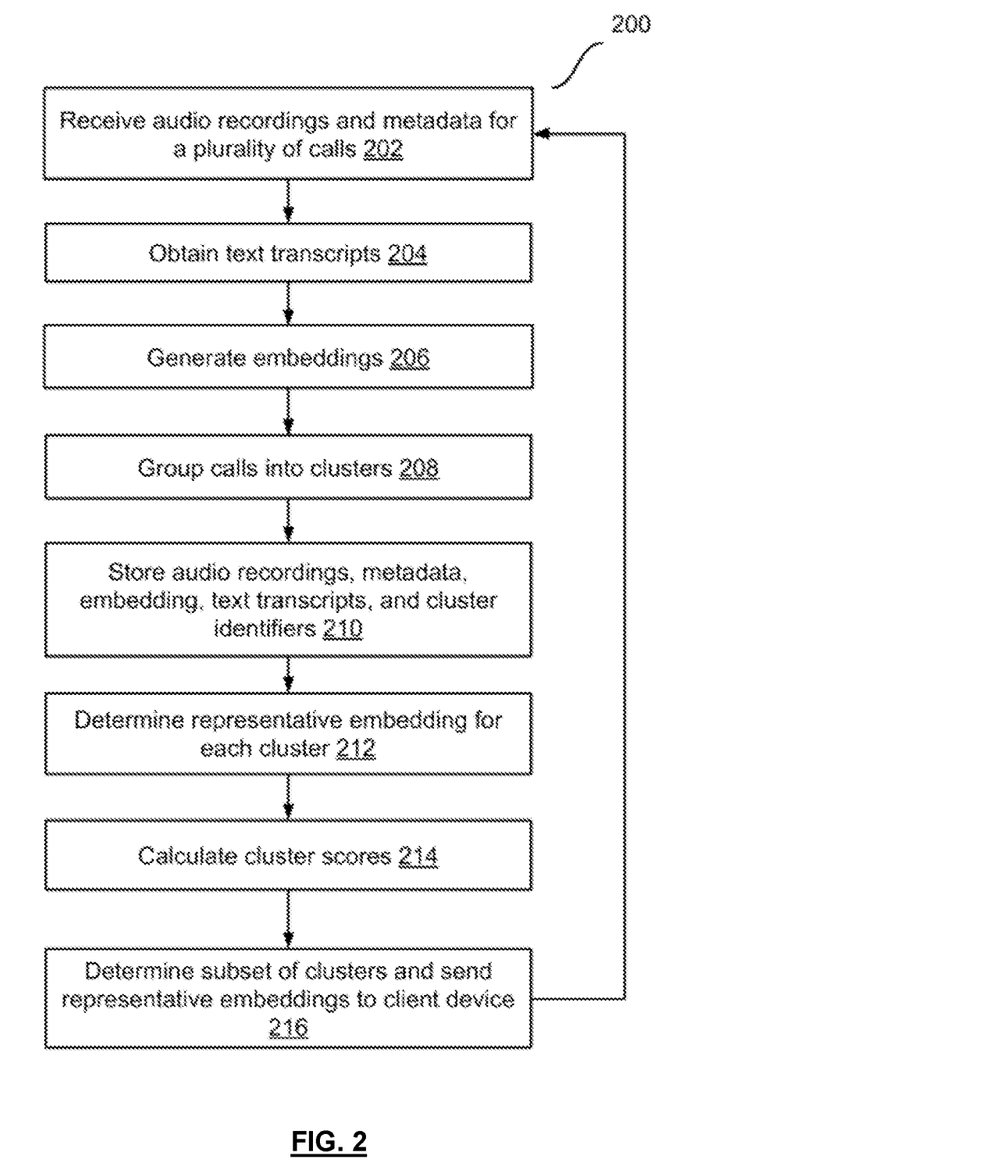
FIG. 2 is a block diagram illustrating an example method to generate spam embeddings, according to some implementations.

FIG. 2 is a flow diagram illustrating an example method 200 to generate spam embeddings, according to some implementations. In some implementations, method 200 can be implemented, for example, on a server system 102 as shown in FIG. 1. In some implementations, some or all of the method 200 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 200. In some examples, a first device is described as performing blocks of method 200. Some implementations can have one or more blocks of method 200 performed by one or more other devices (e.g., other client devices or server devices) that can send results or data to the first device.

In some implementations, the method 200, or portions of the method, can be initiated automatically by a system. In some implementations, the implementing system is a first device. For example, the method (or portions thereof) can be periodically performed (e.g., once a day, once a week, once a month, etc.) or performed based on one or more particular events or conditions, e.g., a threshold number of spam reports (e.g., that indicate that a spam call caused the user to be alerted) being received from client devices, a predetermined time period having expired since the last performance of method 200, and/or one or more other conditions occurring which can be specified in settings read by the method.

Method 200 may begin at block 202. At block 202, a plurality of audio recordings and metadata associated with the audio recordings may be received. In some implementations, the audio recordings may be recordings of telephone calls or other audio/video calls with at least two participants. For example, the audio recordings may be obtained from a training database that includes recordings of calls and/or other audio that are obtained with consent from all participants (e.g., call recipients and originators) of those recordings. In some implementations, the recordings may include only a caller portion of the audio. In some implementations, in addition to the audio recordings, metadata associated with the call may also be received. In some implementations, the metadata may include, e.g., a caller identifier such as a caller phone number. In some implementations, the metadata may include country information for the caller. Block 202 may be followed by block 204.

At block 204, a text transcript of each of the audio recordings may be obtained. For example, the text transcript may be obtained by transcribing the audio recordings using a speech-to-text technique. In some implementations, the text transcript may be received along with the call recording. Block 204 may be followed by block 206.

At block 206, a respective embedding may be generated for each of the plurality of audio recordings. In some implementations, the audio may be converted to a byte stream and resampled, e.g., to 8K. prior to generating the embedding. In some implementations, an audio spectrogram may be obtained. An embedding may be low-dimensional representation of a sparse vector, e.g., generated from an audio recording and/or a text transcript. The embedding is generated such that it is non-reversible, e.g., does not include sufficient data to recover the audio recording and/or text transcript. For example, the embeddings may be generated by the use of a trained machine-learning model. Each embedding may be a numerical representation generated by the trained machine-learning model based on the audio recording and/or the text transcript of the audio recording.

Embeddings for calls that include similar audio, e.g., a pre-recorded audio message that is included, may be similar to each other while the embedding for calls that include dissimilar audio may be different from each other. Similarity between two embeddings may be indicated in a variety of ways including in transformed spaces. For example, similarity between two embeddings may be indicated by an edit distance, e.g., a minimum number of operations to transform one embedding to the other, a Euclidean distance between the two embeddings, etc. In some implementations, embeddings for two calls may be similar when what is said in the calls (e.g., as indicated by text transcripts of the two calls) is similar. For example, when a text transcript for the two calls includes similar text (e.g., "Hi!This is John. I am calling from bank XYZ to offer you a credit card . . . "), embeddings for the calls may have greater similarity, than when the text transcripts do not include similar text. In some implementations, e.g., when embeddings are generated based on audio recordings and on text transcripts, the similarity between embeddings for two calls may be based on both the audio and text transcript. Block 206 may be followed by block 208.

At block 208, the calls may be grouped into a plurality of clusters. For example, the grouping may be performed such that the embedding for each call within a cluster is within a threshold edit distance from the respective embeddings for other calls within the cluster. The grouping may be performed in a variety of ways including in transformed spaces. Further, the grouping may be performed such that the respective embeddings for calls in other clusters are not within the threshold edit distance from calls within the cluster. Block 208 may be followed by block 210.

At block 210, a plurality of tuples may be stored in a database. Each tuple may include a particular audio recording, the associated metadata, the embedding for the particular audio recording, and a cluster identifier for a cluster that the particular audio recording is grouped into. In implementations where the text transcript for the particular audio recording is obtained, the text transcript may also be stored in the tuple. Block 210 may be followed by block 212.

At block 212, a representative embedding is determined for each cluster of the plurality of clusters. In some implementations, the embedding associated with the first audio recording in the cluster, e.g., the audio recording that is associated with an earliest timestamp in the metadata, may be selected as the representative embedding. In some implementations, an average of a plurality of embeddings that correspond to calls in the cluster may be selected as the representative embedding. In some implementations, a particular embedding of the plurality of embeddings that correspond to calls in the cluster that is closest to the average of the plurality of embeddings (e.g., by edit distance, or other distance metric) may be selected as the representative embedding. Block 212 may be followed by block 214.

At block 214, a respective score may be calculated for each of the plurality of clusters. In some implementations, a count of calls in the cluster may be determined, e.g., by counting the number of tuples in the database that include the cluster identifier. In some implementations, a number of calls in the cluster that have been identified as spam calls may be determined, e.g., based on the metadata. In some implementations, the cluster score may be based on the count of calls and/or the number of calls in the cluster that have been identified as spam calls. For example, the cluster score for a cluster that includes a large proportion (e.g., 75%) of spam calls may be higher than that for a cluster that includes a smaller proportion (e.g., 20%) of spam calls. In another example, when two clusters have a similar proportion of spam calls (e.g., 50%), the cluster score for a cluster that includes a larger count of calls (e.g., 10,000 calls) may be higher than the cluster score for a cluster that includes a smaller count of calls (e.g., 100 calls). Block 214 may be followed by block 216.

At block 216, a subset of the plurality of clusters (or a model based on the subset of the plurality of clusters) may be determined. For example, the subset may be determined to include those clusters of the plurality of clusters that are associated with a score that meets a score threshold. For example, the subset may include clusters that are likely representative of spam calls.

Further, the representative cluster in the subset of clusters (embeddings that serve to model the calls within that cluster) may be sent to one or more client devices. The representative embeddings may be usable by the client device to compare with a call embedding locally generated on the client device (e.g., based on a received call) and to determine whether the received call is a spam call. For example, the client device may determine that the received call is a spam call when the .call embedding for the received call matches at least one representative embedding, indicating that the received call is similar to calls that were identified as spam, e.g., matches the characteristics of a spam cluster).

In some implementations, the client device may be a mobile telephone, e.g., connected to a cellular telephony network. In these implementations, data may be received from the client device indicative of a home country (e.g., a registration country) or a current country (e.g., where the device is currently present) of the client device. In these implementations, determining the subset of clusters may further comprise selecting the subset of clusters based on the received data. For example, the subset of clusters may be selected such that clusters that include calls that have metadata that does not match the current country or the home country are excluded from the subset. Selecting the subset in this manner may provide the benefit that only such representative embeddings are sent to the client device as suitable for the location of the client device. Block 216 may be followed by block 202, where audio recordings and metadata may be received for additional calls.

In some implementations, performance metrics related to spam detection, e.g., precision (e.g., percentage of calls detected as spam calls that were actually spam), recall (e.g., calls detected as spam as a percentage of total spam calls), latency in determination of whether a call is spam, etc. may be obtained. Based on the performance metrics, one or more clusters may be removed from the subset (e.g., low precision clusters). Further, the machine-learning model may be updated, e.g., retrained and the spam embeddings may be regenerated after the retraining. For example, the model may be trained to generate smaller embeddings in response to determination that the latency of spam call detection is high. Training the model may include updating weights of one or more nodes in one or more layers of the model. Spam embeddings may also be updated based on additional training data, when additional recordings become available that were not previously utilized to generate the spam embeddings. In some implementations, based on the performance metrics, a model based on the one or more clusters may be refined, e.g., by removing low precision clusters.

Various blocks of method 200 may be combined, split into multiple blocks, or be performed in parallel. For example, blocks 202 and 204 may be combined. In another example, blocks 212 and 214 may be performed in parallel. In some implementations, the blocks may be performed in a different order. For example, block 210 may be performed before block 208, or blocks 208 and 210 may be performed in parallel.

Method 200, or portions thereof, may be repeated any number of times using additional inputs. In some implementations, e.g., when method 200 is repeated upon receipt of additional recordings, clusters identified from a previous iteration of method 200 may be updated in block 208. Further, representative embeddings for one or more clusters may be updated (by executing block 212) and/or cluster scores may be updated (by executing block 214) when additional recordings that match the cluster are received.

While the foregoing discussion with reference to FIG. 2 refers to call embeddings, any type of representation can be generated based on call audio and/or call text transcript that serves to identify different types of calls, e.g., regular or genuine calls, robo calls (e.g., where a calling party is an automated agent), a spam call (e.g., where the call that is unwanted by the call recipient), etc. The representation can then be used to perform clustering such that the cluster models the calls that are part of that cluster. Any number of clusters can be generated, based on the dataset. For example, each cluster may be associated with one or more types of robo or spam call (e.g., a particular robo caller, particular call topics), etc.

In some implementations, the call representation may serve to indicate whether a call is automated based on whether caller audio in the call includes human speech (received from the caller) or includes machine-generated speech (received from the caller). In these implementations, the call audio may be analyzed using one or more machine learning models that are trained to differentiate between human speech and machine-generated speech.

Figure 3:
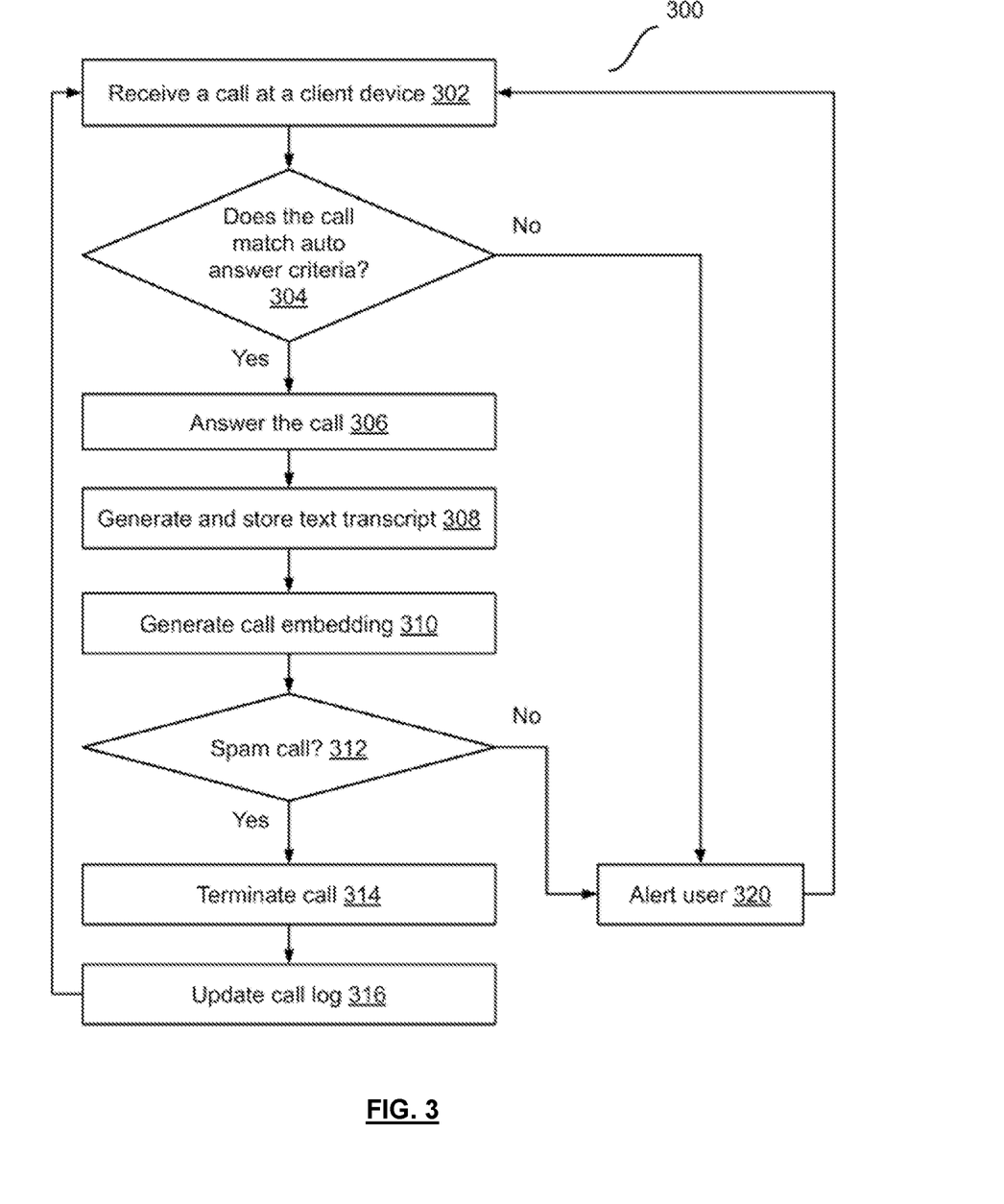
FIG. 3 is a block diagram illustrating an example method to automatically answer calls and terminate spam calls, according to some implementations.

FIG. 3 is a flow diagram illustrating an example method 300 to automatically answer calls and terminate spam calls, according to some implementations. In some implementations, method 300 can be implemented on one or more client devices 120, 122, 124, or 126 as shown in FIG. 1. In the described examples, the implementing system includes one or more digital processors or processing circuitry ("processors"), and one or more storage devices.

In some implementations, the method 300, or portions of the method, can be initiated automatically by a client device. For example, method 300 may be automatically initiated upon receipt of a call, e.g., a telephone call, a voice over internet protocol (VoIP) call, a video call, etc. In some implementations, the implementing system is a client device, e.g., a cellular telephone or wearable device (e.g., smartwatch), configured to receive telephone calls, VoIP calls, video calls, etc. In some implementations, the implementing system is a client device, e.g., a tablet, a laptop computer, a desktop computer, or other device configured to receive VoIP calls, video calls, etc.

Method 300 is implemented with specific user permission. For example, a call configuration user interface may be provided that enables the user to specify whether to enable spam call detection/mitigation. The user is provided with information that enabling spam call detection requires enabling call recording and transcription, and is provided the option to disable spam call detection entirely.

Method 300 may begin at block 302. At block 302, a call is received at a client device. The call may be a voice call, e.g., a telephone call; a VoIP call, e.g., received via an over-the-top (OTT) calling application; a video call; etc. In some implementations, the call may be received by a call application that executes on the client device. Block 302 may be followed by block 304.

At block 304, it is determined if the call matches auto answer criteria. In some implementations, it may be determined that the call matches auto answer criteria when an identifier (e.g., a phone number, a username associated with an OTT calling application, etc.) associated with the call matches a spam caller list. The identifier associated with the call may be an identifier of a caller (caller device) that the call is received from. For example, the spam caller list may be stored locally at the client device. In some implementations, with user permission, a contact list of the user stored locally on the client device may be used to determine if the call matches auto answer criteria. If the user denies such permission, the contact list is not accessed and any criteria that require access to the contact list are skipped (not utilized in block 304).

In some implementations, it may be determined that the call matches auto answer criteria when the identifier (phone number) associated with the call is a fake number. For example, a fake number may be a non-existent number, e.g., a number not assigned to a telephone user, or an invalid number, e.g., that doesn't match telephone numbering standards.

In some implementations, it may be determined that the call matches auto answer criteria when the identifier (phone number) associated with the call is a private number. For example, if the call is a telephone call and no caller ID is received or a caller ID that indicates a private number is received, the call may be determined to be from a private number.

In some implementations, it may be determined that the call matches auto answer criteria when the identifier (caller phone number) associated with the call and an identifier (callee phone number) associated with the client device meet a similarity threshold. For example, the similarity threshold may be determined to be met when the first six digits (or other combinations of digits) of the caller phone number and the callee phone number are identical.

In some implementations, it may be determined that the call matches auto answer criteria when the identifier associated with the call is not in a contact list of a user of the client device, e.g., stored locally on the client device. The contact list may include a personal contacts of the user, e.g., maintained via a personal account, and/or business contacts of the user, e.g., maintained via a business account, such as stored in an enterprise directory or address book.

In some implementations, it may be determined that the call matches auto answer criteria when the identifier associated with the call is not in a call log of the client device. For example, such a call may be deemed to be from a first time caller or an unknown caller.

In different implementations, various combinations of the above (and additional criteria, e.g., whether the phone number is in a certain range) can be used to determine whether a call matches auto answer criteria. In some implementations, a user of the client device may select the auto answer criteria. For example, a user may specify any subset of the above as their auto answer criteria. Different users can specify different auto answer criteria. In some implementations, a user interface may be provided that enables a user to provide user input that specifies the auto answer criteria. The auto answer criteria may be stored locally on the client device and/or synchronized with a server.

In some implementations, different auto answer criteria may be used on the same client device based on context. For example, auto answer criteria may be different when the device is in a do not disturb (DND) mode or when it is detected that the user is busy (e.g., based on user permitted data such as user's appointments) than when the device is not in a DND mode. In another example, auto answer criteria may be different based on a time of day, day of the week, etc. For example, stringent auto answer criteria may be used when the device is in DND mode, when the user is busy, or when the time is night (or holiday), while less stringent auto answer criteria may be used in other situations. In some implementations, if the user permits, a location of the client device at the time the call is received may be determined (e.g., home, work, in a foreign country, etc.) and may be utilized to select the auto answer criteria.

In some implementations, a call may be determined as not meeting auto answer criteria when at least one of the following conditions is met: the identifier associated with the call is in a contact list of a user of the client device, the identifier associated with the call is in a call log of the client device (e.g., the user recently placed a call to or answered a call from a caller device associated with the identifier), the identifier associated with the call indicates that the call is an emergency call, or if an emergency call was placed from the client device within a threshold from a current time (the time that the call is received).

If the call matches auto answer criteria, block 304 may be followed by block 306. Else, block 304 may be followed by block 320.

At block 306, the call is automatically answered by the client device. For example, the call is answered without user input (e.g., selecting an answer button or similar input) and without alerting the user, e.g., without ringing the client device. In some implementations, answering the call may include establishing a connection between the client device and the caller device and sending auto-generated audio (generated without user input or interaction) from the client device. For example, the auto-generated audio may indicate that the call was automatically answered and request the caller to provide further information. For example, the auto-generated audio may include "This is <username>'s virtual assistant; may I know who is calling?" or other message that indicates that the call was automatically answered and/or requests additional information from the caller. Such audio may be responded to by the caller and further back-and-forth interaction may be conducted. For example, if the caller states "I am calling from restaurant X to confirm your reservation at 6 pm," a response such as "Thank you" may be provided. Block 306 may be followed by block 308.

At block 308, a text transcript of the call may be generated. For example, the text transcript may include a caller portion and an automatically generated portion. The call transcript is generated locally on the client device using any suitable speech to text technique. In some implementations, the text transcript may be stored locally on the client device in association with the call. Block 308 may be followed by block 310.

At block 310, call embedding may be generated (e.g., based on the call content). In some implementations, the call embedding may be generated locally on the client device using a trained machine-learning model, e.g., similar to the trained machine-learning model described with reference to FIG. 2. In some implementations, generating the call embedding may be based on the received audio of the call. In some implementations, generating the call embedding may further be based on the text transcript of the call. Block 310 may be followed by block 312.

At block 312, it is determined if the call is a spam call, e.g., an unwanted call, a call placed by a robocaller, etc. To make such a determination, the call embedding is compared with spam embeddings, e.g., generated using the method described with reference to FIG. 2 (e.g., on a server) and downloaded from a server to local storage of the client device, e.g., received from the server when the client device has an active network connection. In some implementations, one or more spam embeddings may be generated locally on the client device, e.g., based on prior calls that the user marked as spam. In some implementations, the spam embeddings may include a plurality of embeddings, each representative of a particular cluster. Comparing the call embedding may include performing comparisons between the call embedding and one or more of the plurality of embeddings, e.g., to determine whether a distance (e.g., a Euclidean distance) between the call embedding and at least one of the plurality of embeddings meets a distance threshold.

For example, if p represents the call embedding and q represent one of the spam embeddings, and each embedding has n dimensions, the Euclidean distance between the embeddings d(p,q)=d(q,p) is given by the formula:

$$\sqrt{\sum_{i=1}^{n}(qi-pi)^2}$$

In some implementations, a first threshold distance may be used for the comparison. If the distance between the call embedding and one of the spam embeddings is less than the first threshold distance, the embeddings are determined to match and the call is detected as a spam call. In some implementations, a second threshold distance (greater than the first threshold distance) may be used. If the distance between two embeddings is greater than or equal to the first threshold distance and less than the second threshold distance, the embeddings may be determined to match if no other spam embedding is within the second threshold distance from the call embedding, and the call is detected as a spam call.

In some implementations, a single threshold distance may be used and if the distance between the call embedding and at least one of the plurality of embeddings meets the distance threshold, it is determined that the call is a spam call. If it is determined that the call is a spam call, block 312 may be followed by block 314. Else, block 312 may be followed by block 320.

At block 314, the call is terminated. For example, terminating the call may include severing the connection between the client device and the caller device. In some implementations, terminating the call may further include providing audio to the caller device, e.g., "<username> does not wish to receive calls from you. Please remove from your list" or other message. Further, upon detection of a spam call, a spam warning may be displayed on a user interface of the client device. Block 314 may be followed by block 316.

At block 316, a call log on the client device is updated. In some implementations, the call log may be updated to add the call (e.g., caller identifier and call receipt time) and the text transcript of the call to the call log. In some implementations, a status of the call in the call log may be set as missed. For example, since a connection was established between the caller device and the client device, an operating system (or other call handling component) of the client device may detect the call as "received"; however, since the call was answered automatically, the status of the call in the call log is updated to "missed" such that when a user reviews the call log, only such calls where the user actively answered the call have the status "received" while unanswered calls and calls that were automatically answered have the status "missed." Such status updates may provide a consistent user experience where a call is marked received only when the user was actively engaged with the call, e.g., manually answered the call. Further, providing the text transcript and/or saved audio of the call (that can be played back by the user) in the call log may enable the user to review the interaction with the caller of an automatically answered call. For example, the user may determine, upon review, that the call is not a spam call and may provide feedback that indicates that the classification as a spam call was erroneous. Such user feedback may be utilized, with user permission, as performance metrics to update the machine-learning model and/or the spam embeddings. Block 316 may be followed by block 302 where another call may be received.

If it is determined at block 304 that the call does not match auto answer criteria, or if it is determined at block 312 that the call is not a spam call, block 320 is performed. At block 320, the user of the client device is alerted. If block 320 is performed immediately after block 304 (the call does not match auto answer criteria), alerting the user may include ringing the client device. If block 320 is performed immediately after block 312 (the call was automatically answered, but is not a spam call), alerting the user may include ringing the client device and providing a text transcript of the received audio of the call. For example, a portion of the text transcript of the received audio or a summary may be provided, e.g., if the caller said "I am calling from restaurant X to confirm your reservation at 6 pm," alerting the user may include displaying or speaking aloud the text "Call from restaurant X to confirm 6 pm reservation." In another example, if the caller said "Hi I'm Jane calling with an urgent question on your plumbing account" alerting the user may include displaying or speaking aloud the text "Urgent call from Jane on appointment."

For example, salient features from the text transcript, e.g., caller identity, call topic, dates/times, etc. may be extracted and provided to the user. Further, prior to the user joining the call, a message may be provided to the caller, e.g., "routing your call to <username>". If the user permits, the text transcript may be analyzed to provide additional information. For example, if the call is a call from a Doctor's office, related to an urgent situation (e.g., water leakage at home), etc. an indicator that the call is important may be provided to the user. In some implementations, a categorization of the call (e.g., appointment, follow-up, social, etc.) or a context of the call (important/not important) may be determined and provided to the user. If the caller audio is unclear or in a language that has low transcription accuracy, an indication to that effect, e.g., "caller audio unclear" or "foreign language" may be provided via a user interface while alerting the user. Block 320 may be followed by block 302.

In some implementations, while a call is being automatically answered (e.g., block 306), a second call may be received at the client device. In such a case, the second call may be automatically rejected. In some implementations, the user may be provided an option to manually reject the second call, merge the second call with the ongoing call, etc. In some implementations, if a user is speaking on a call and a second call is received, the second call may be handled using method 300; however, instead of alerting the user (block 320), a message may be provided to the caller that the user is busy. In this case, the second call may be added to the call log as a missed call, with an associated text transcript.

Method 300 may be performed entirely on a client device that receives the call. Further, a technical benefit of is that the described method does not require that the client device have an active Internet connection, thus allowing spam call detection and mitigation even when the device is not connected to the Internet. Further, since the method is performed locally, no network resources are consumed. Still further, no user data is sent to a server or other third-party device. The described techniques can therefore address the problem of spam calls, including calls from robocallers, without disturbing the user, and in a manner that does not require sharing of user data. If the user permits, an indication of misclassification of a call as "spam" or "not spam" may be sent to the server, based on user feedback.

Various blocks of method 300 may be combined, split into multiple blocks, or be performed in parallel. For example, blocks 306 and 308 may be combined, or performed in parallel. Further, different call answer criteria may be used based on phone state (phone in DND mode, ringer off or silent mode, etc.) or based on user-permitted contextual factors (e.g., time of day, whether the client device is stationary or in a vehicle, etc.)

In some implementations, recordings and text transcripts of automatically answered calls may be stored locally on the client device and provided to the user for review. The user is provided with options to delete the recordings and transcripts.

If the client device is configured with one or more other devices, e.g., a wireless coupled wearable device such as headphones, wristband, watch, etc. or another device that shares the identifier of the client device, in block 306, it is ensured that no user alert is generated on any such device.

In some implementations, users may be provided with options to indicate when a particular call is misclassified. For example, users may provide an indication that particular calls that were detected as spam or robo calls were in fact from genuine callers. In these implementations, if at least a threshold number of such user-provided indications are received and are determined to be reliable, clusters associated with such calls may be updated to indicate that the calls are not spam or robo calls. In some implementations, clusters may be updated periodically, and updated representative embeddings (or other representations) may be provided to client devices for use in call screening, call classification, detection of spam or robo callers, and/or automatically answering calls.

Figure 4:
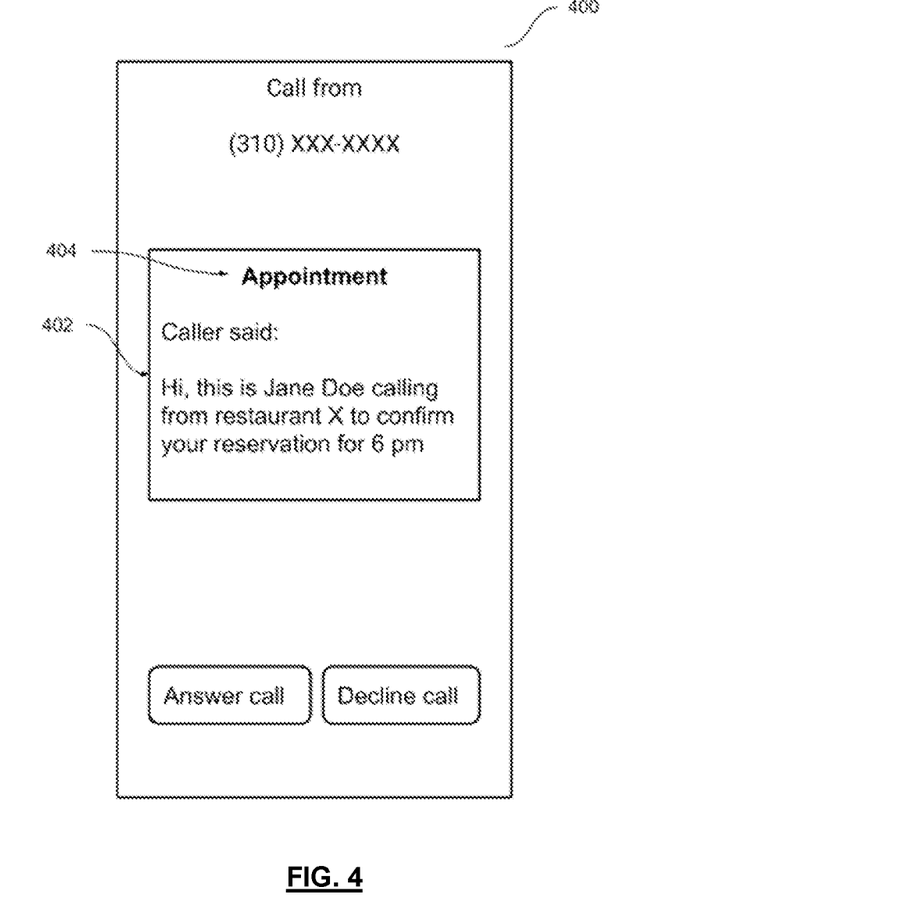
FIG. 4 is an illustration of an example user interface, according to some implementations.

FIG. 4 is an illustration of an example user interface 400, according to some implementations. In the example shown in FIG. 4, the client device received a call from a phone number "(310) XXX-XXX" that was answered using the techniques described herein with reference to FIG. 3. User interface 400 includes a text transcript 402 ("Caller said . . . ") and a categorization 404 ("Appointment"). User interface 400 provides options for a user of the client device to answer the call or to decline the call.

Figure 5:
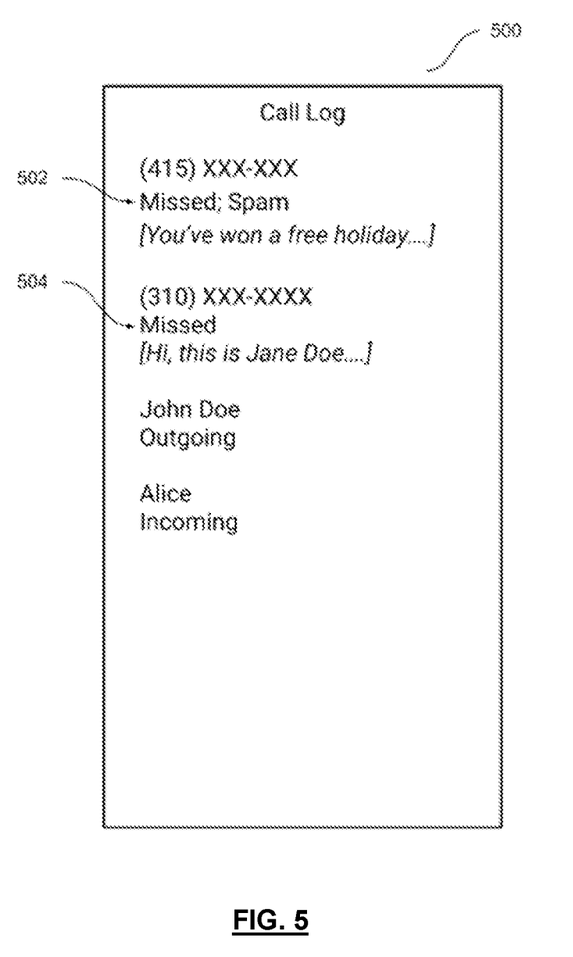
FIG. 5 is an illustration of an example user interface, according to some implementations.

FIG. 5 is an illustration of an example user interface 500, according to some implementations. In the example shown in FIG. 5, the user interface for a call log of a client device is shown. In the call log, a most recent call 502 from "(415)XXX-XXXX" is shown as "Missed" and is categorized as spam. A text transcript of the call—"You've won a free holiday . . . " is also shown. While not shown in FIG. 5, in some implementations, a user interface element may be included that enables the user to initial playback of a recording of the call in addition to or alternative to the text transcript. The user interface enables the user to see that a spam call was automatically answered silently, without disturbing the user. Another call 504 from "(310)-XXX-XXXX" is shown as "Missed" along with a corresponding call transcript (and/or recording). The call 504 was answered automatically and determined to not be spam; however, the user didn't answer the call, hence it is categorized as a "Missed" call. The text transcript of the automatically answered call is shown. Other calls that the user engaged in via the client device are also shown.

Figure 6:
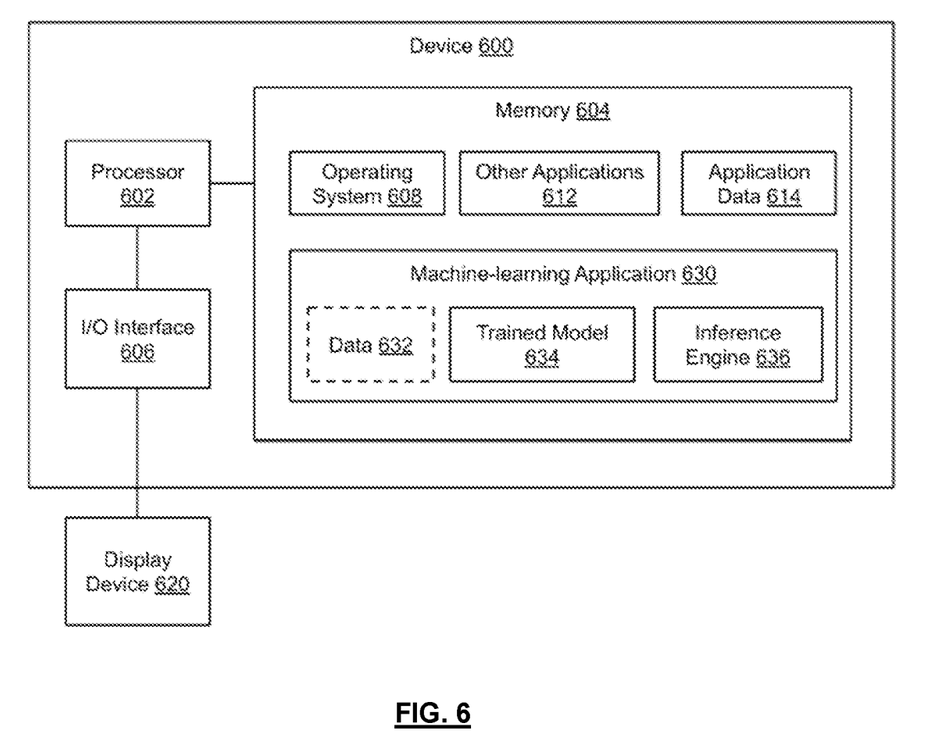
FIG. 6 is a block diagram of an example device which may be used for one or more implementations described herein.

FIG. 6 is a block diagram of an example device 600 which may be used to implement one or more features described herein. In one example, device 600 may be used to implement a client device, e.g., any of client devices 115 shown in FIG. 1. Alternatively, device 600 can implement a server device, e.g., server 104. In some implementations, device 600 may be used to implement a client device, a server device, or both client and server devices. Device 600 can be any suitable computer system, server, or other electronic or hardware device as described above.

One or more methods described herein can be run in a standalone program that can be executed on any type of computing device, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.).

In some implementations, device 600 includes a processor 602, a memory 604, and input/output (I/O) interface 606. Processor 602 can be one or more processors and/or processing circuits to execute program code and control basic operations of the device 600. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 602 may include one or more co-processors that implement neural-network processing. In some implementations, processor 602 may be a processor that processes data to produce probabilistic output, e.g., the output produced by processor 602 may be imprecise or may be accurate within a range from an expected output. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, machine-learning application 630, other applications 612, and application data 614. Other applications 612 may include applications such as a call application, data display engine, web hosting engine, image display engine, notification engine, social networking engine, etc. In some implementations, the machine-learning application 630 and/or other applications 612 can include instructions that enable processor 602 to perform functions described herein, e.g., some or all of the methods of FIGS. 2 and 3.

Other applications 612 can include, e.g., call applications, media display applications, communication applications, web hosting engines or applications, mapping applications, media sharing applications, etc. One or more methods disclosed herein can operate in several environments and platforms, e.g., as a stand-alone computer program that can run on any type of computing device, as a mobile application ("app") run on a mobile computing device, etc.

In various implementations, machine-learning application may utilize Bayesian classifiers, support vector machines, neural networks, or other learning techniques. In some implementations, machine-learning application 630 may include a trained model 634, an inference engine 636, and data 632. In some implementations, data 632 may include training data, e.g., data used to generate trained model 634. For example, training data may include any type of data such as audio recordings, text transcripts, etc. When trained model 634 is a model that generates embeddings, training data may include audio recordings and associated metadata.

Training data may be obtained from any source, e.g., a data repository specifically marked for training, data for which permission is provided for use as training data for machine-learning, etc. In implementations where one or more users permit use of their respective user data to train a machine-learning model, e.g., trained model 634, training data may include such user data.

In some implementations, training data may include synthetic data generated for the purpose of training, such as data that is not based on user input or activity in the context that is being trained, e.g., data generated from audio recordings without human participants or other computer-generated audio recordings. In some implementations, machine-learning application 630 excludes data 632. For example, in these implementations, the trained model 634 may be generated, e.g., on a different device, and be provided as part of machine-learning application 630. In various implementations, the trained model 634 may be provided as a data file that includes a model structure or form, and associated weights. Inference engine 636 may read the data file for trained model 634 and implement a neural network with node connectivity, layers, and weights based on the model structure or form specified in trained model 634.

In some implementations, the trained model 634 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers.

For example, the nodes of a first layer (e.g., input layer) may receive data as input data 632 or application data 614. For example, when trained model 634 generates embeddings, the input data may include audio recordings and/or text transcripts generated from audio recordings. Subsequent intermediate layers may receive as input output of nodes of a previous layer per the connectivity specified in the model form or structure. These layers may also be referred to as hidden layers or latent layers.

A final layer (e.g., output layer) produces an output of the machine-learning application. For example, the output may be an embedding for the input audio recording. In some implementations, model form or structure also specifies a number and/or type of nodes in each layer.

In different implementations, trained model 634 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 634 may include weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 632, to produce a result.

For example, training may include applying supervised learning techniques. In supervised learning, the training data can include a plurality of inputs (audio recordings) and a corresponding expected output for each input (e.g., embeddings, spam/not spam labels, etc.). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner, e.g., have similar embeddings. For example, the model may be trained to differentiate audio recordings such that the model distinguishes spam from genuine calls.

In some implementations, unsupervised learning may be used to produce knowledge representations, e.g., that may be used by machine-learning application 630. For example, unsupervised learning may be used to produce embeddings that are utilized as described above with reference to FIGS. 2 and 3. In various implementations, a trained model includes a set of weights corresponding to the model structure. In implementations where data 632 is omitted, machine-learning application 630 may include trained model 634 that is based on prior training, e.g., by a developer of the machine-learning application 630, by a third-party, etc. In some implementations, trained model 634 may include a set of weights that are fixed, e.g., downloaded from a server that provides the weights.

Machine-learning application 630 also includes an inference engine 636. Inference engine 636 is configured to apply the trained model 634 to data, such as application data 614, to provide an inference. In some implementations, inference engine 636 may include software code to be executed by processor 602. In some implementations, inference engine 636 may specify circuit configuration (e.g., for a programmable processor, for a field programmable gate array (FPGA), etc.) enabling processor 602 to apply the trained model. In some implementations, inference engine 636 may include software instructions, hardware instructions, or a combination. In some implementations, inference engine 636 may offer an application programming interface (API) that can be used by operating system 608 and/or other applications 612 to invoke inference engine 636, e.g., to apply trained model 634 to application data 614 to generate an inference. For example, the inference for a spam detection model may be a categorization of a received call, e.g., based on comparison with spam embeddings.

Machine-learning application 630 may provide several technical advantages. For example, when trained model 634 is generated based on unsupervised learning, trained model 634 can be applied by inference engine 636 to produce knowledge representations (e.g., numeric representations) from input data, e.g., application data 614. For example, a model trained to generate embeddings may produce representations of calls that have a smaller data size (e.g., 1 KB) than input audio recordings (e.g., 1 MB). In some implementations, such representations may be helpful to reduce processing cost (e.g., computational cost, memory usage, etc.) to generate an output (e.g., a label, a classification, etc.).

In some implementations, such representations may be provided as input to a different machine-learning application that produces output from the output of inference engine 636. In some implementations, knowledge representations generated by machine-learning application 630 may be provided to a different device that conducts further processing, e.g., over a network. For example, spam embeddings generated using the techniques described with reference to FIG. 2 can be provided to client devices for use in comparison and detection of spam calls, as described with reference to FIG. 3. In such implementations, providing the knowledge representations rather than the audio recordings of spam calls may provide a technical benefit, e.g., enable faster data transmission with reduced cost. In another example, a model trained to cluster audio recordings clustering documents may produce clusters from input audio recordings. The clusters may be suitable for further processing (e.g., determining whether a received call is a spam call. etc.) without the need to access the original recordings, and therefore, save computational cost.

In some implementations, machine-learning application 630 may be implemented in an offline manner. In these implementations, trained model 634 may be generated in a first stage, and provided as part of machine-learning application 630. In some implementations, machine-learning application 630 may be implemented in an online manner. For example, in such implementations, an application that invokes machine-learning application 630 (e.g., operating system 608, one or more of other applications 612) may utilize an inference produced by machine-learning application 630, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 634, e.g., to update embeddings for trained model 634.

In some implementations, machine-learning application 630 may be implemented in a manner that can adapt to particular configuration of device 600 on which the machine-learning application 630 is executed. For example, machine-learning application 630 may determine a computational graph that utilizes available computational resources, e.g., processor 602. For example, machine-learning application 630 may determine that processor 602 includes a GPU with a particular number of GPU cores (e.g., 1000) and implement the inference engine accordingly (e.g., as 1000 individual processes or threads).

In some implementations, machine-learning application 630 may implement an ensemble of trained models. For example, trained model 634 may include a plurality of trained models that are each applicable to same input data. In these implementations, machine-learning application 630 may choose a particular trained model, e.g., based on available computational resources, success rate with prior inferences, etc. In some implementations, machine-learning application 630 may execute inference engine 636 such that a plurality of trained models is applied. In these implementations, machine-learning application 630 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 608 or one or more applications 612, e.g., to determine whether the call is a spam call or not.

In different implementations, machine-learning application 630 can produce different types of outputs. For example, machine-learning application 630 can provide representations or clusters (e.g., numeric representations of input data), labels (e.g., for input data that includes images, documents, audio recordings, etc.), etc. In some implementations, machine-learning application 630 may produce an output based on a format specified by an invoking application, e.g. operating system 608 or one or more applications 612.

Any of software in memory 604 can alternatively be stored on any other suitable storage location or computer-readable medium. In addition, memory 604 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the device 600 with other systems and devices. Interfaced devices can be included as part of the device 600 or can be separate and communicate with the device 600. For example, network communication devices, storage devices (e.g., memory and/or database 106), and input/output devices can communicate via I/O interface 606. In some implementations, the I/O interface can connect to interface devices such as input devices (keyboard, pointing device, touchscreen, microphone, camera, scanner, sensors, etc.) and/or output devices (display devices, speaker devices, printers, motors, etc.). I/O interface 606 can also include a telephony interface, e.g., to couple device 600 to a cellular network or other telephony network.

Some examples of interfaced devices that can connect to I/O interface 606 can include one or more display devices 620 that can be used to display content, e.g., images, video, and/or a user interface of an output application as described herein. Display device 620 can be connected to device 600 via local connections (e.g., display bus) and/or via networked connections and can be any suitable display device. Display device 620 can include any suitable display device such as an LCD, LED, or plasma display screen, CRT, television, monitor, touchscreen, 3-D display screen, or other visual display device. For example, display device 620 can be a flat display screen provided on a mobile device, multiple display screens provided in a goggles or headset device, or a monitor screen for a computer device.

For ease of illustration, FIG. 6 shows one block for each of processor 602, memory 604, I/O interface 606, and software blocks 608, 612, and 630. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While some components are described as performing blocks and operations as described in some implementations herein, any suitable component or combination of components of environment 100, device 600, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

'In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:
receiving a plurality of audio recordings wherein each audio recording corresponds to a respective call of a plurality of calls, and metadata for each of the plurality of calls;
generating, using a trained machine-learning model, a respective embedding for each of the plurality of calls based on the corresponding audio recording, wherein the respective embedding is a numerical representation of the call;
grouping the plurality of calls into a plurality of clusters based on the respective embeddings; and
storing, in a database, a plurality of tuples, each tuple including a particular audio recording of the plurality of audio recordings, associated metadata, the embedding for the particular audio recording, and a cluster identifier for the particular audio recording.

2. The computer-implemented method of claim 1, further comprising:
obtaining respective text transcripts of the plurality of audio recordings; and
storing the respective text transcripts in a corresponding tuple,
wherein generating the respective embedding for each of the plurality of calls is further based on the text transcript of the call.

3. The computer-implemented method of claim 1, further comprising, for each of the plurality of clusters:
determining a representative embedding for the cluster;
determining a count of calls that match the cluster;
determining a spam call count for the cluster; and
calculating a score for the cluster based on one or more of the count of calls or the spam call count.

4. The computer-implemented method of claim 3, further comprising:
determining a subset of the plurality of clusters, wherein the score for each cluster in the subset of clusters meets a score threshold; and
sending the representative embedding for each cluster in the subset to a client device.

5. The computer-implemented method of claim 4, further comprising receiving data indicative of one or more of a current country or a home country for the client device, and wherein determining the subset further comprises:
selecting the subset based on the received data, wherein clusters that include calls that have metadata that does not match the current country or the home country are excluded from the subset.

6. The computer-implemented method of claim 3, wherein determining the representative embedding for the cluster comprises one of:
selecting an embedding that corresponds to a first audio recording in the cluster as the representative embedding;
selecting an average of a plurality of embeddings that correspond to calls in the cluster as the representative embedding; or
selecting a particular embedding of the plurality of embeddings that is closest to the average of the plurality of embeddings.

7. The computer-implemented method of claim 1, wherein the embedding for each call within each of the plurality of clusters is within a threshold edit distance of embeddings from other calls in the cluster.

8. The computer-implemented method of claim 1, further comprising:
receiving performance metrics; and
updating the machine-learning model based on the performance metrics.

9. A computer-implemented method to automatically answer a call, the method comprising:
receiving, at a client device, a call from a caller device;
determining, by the client device, based on an identifier associated with the call, whether the call matches auto answer criteria;
in response to determining that the call matches the auto answer criteria, answering the call, by the client device, without user input and without alerting a user of the client device; and
after answering the call,
generating, by the client device, using a trained machine-learning model, a call embedding for the call based on received audio of the call, wherein the call embedding is a numerical representation of the call;
comparing, by the client device, the call embedding with spam embeddings to determine whether the call is a spam call; and
in response to determining that the call is a spam call, terminating the call.

10. The computer-implemented method of claim 9, further comprising, after answering the call:

generating and storing, by the client device, a text transcript of the call.

11. The computer-implemented method of claim 10, wherein the generating the call embedding is further based on the text transcript of the call.

12. The computer-implemented method of claim 9, further comprising:
in response to determining that the call is not a spam call, alerting the user of the client device, wherein alerting the user comprises ringing the client device and providing a text transcript of the received audio of the call.

13. The computer-implemented method of claim 9, wherein answering the call comprises: establishing a connection with a caller device; and
sending audio from the client device to the caller device, wherein the sent audio is generated by the client device without user input.

14. The computer-implemented method of claim 9, wherein determining that the call matches auto answer criteria is based on at least one of:
determining that the identifier associated with the call matches a spam caller list;
determining that the identifier associated with the call is a fake number;
determining that the identifier associated with the call is a private number;
determining that the identifier associated with the call and an identifier associated with the client device meet a similarity threshold;
determining that the identifier associated with the call is not in a contact list of a user of the client device; or
determining that the identifier associated with the call is not in a call log of the client device.

15. The computer-implemented method of claim 9, wherein determining that the call does not match the auto answer criteria is based on at least one of:
determining that the identifier associated with the call is in a contact list of a user of the client device;
determining that the identifier associated with the call is in a call log of the client device;
determining that the identifier associated with the call indicates that the call is an emergency call; or
determining that an emergency call was placed from the client device within a threshold from a current time.

16. The computer-implemented method of claim 9, in response to determining that the call does not match the auto answer criteria, alerting the user of the client device.

17. The computer-implemented method of claim 9, wherein the spam embeddings are stored locally on the client device, and wherein the method further comprises receiving the spam embeddings from a server and storing the spam embeddings locally on the client device.

18. A computing device comprising:
a processor; and
a memory coupled to the processor, with instructions stored thereon that, when executed by the processor, cause the processor to perform operations comprising:
receiving a call from a caller device;
determining, based on an identifier associated with the call, whether the call matches auto answer criteria;
in response to determining that the call matches the auto answer criteria, answering the call without user input and without alerting a user of the computing device; and
after answering the call,
generating using a trained machine-learning model, a call embedding for the call based on received audio of the call, wherein the call embedding is a numerical representation of the call;
comparing the call embedding with spam embeddings to determine whether the call is a spam call; and
in response to determining that the call is a spam call, terminating the call.

19. The computing device of claim 18, wherein the memory has further instructions stored thereon that, when executed by the processor, cause the processor to perform further performs operations comprising:
after answering the call, generating and storing a text transcript of the call,
wherein the generating the call embedding is further based on the text transcript of the call.

20. The computing device of claim 18, wherein the operation of answering the call comprises:
establishing a connection with a caller device; and
sending audio from the computing device to the caller device, wherein the sent audio is generated by the computing device without user input.

* * * * *